Feb. 13, 1951         C. TOBIN         2,541,308
DUMP RAKE
Filed Dec. 21, 1945         2 Sheets-Sheet 2
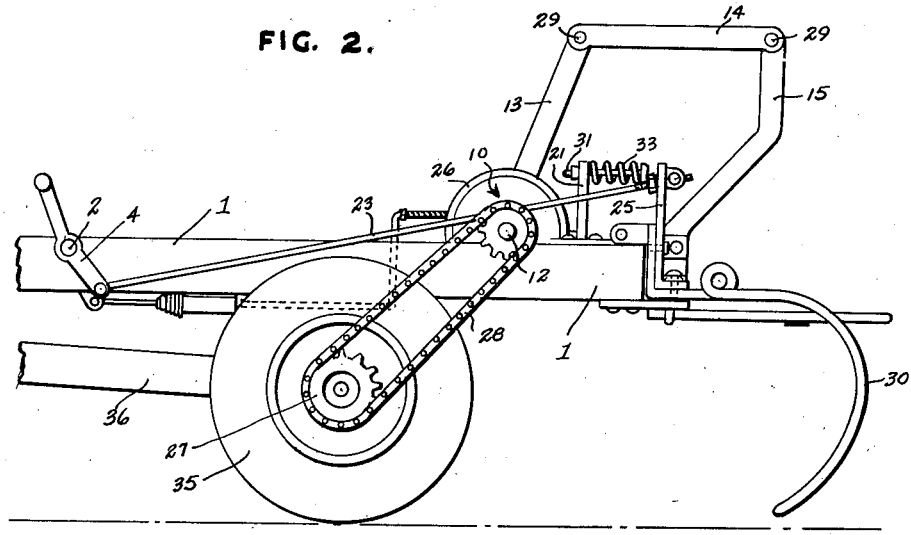
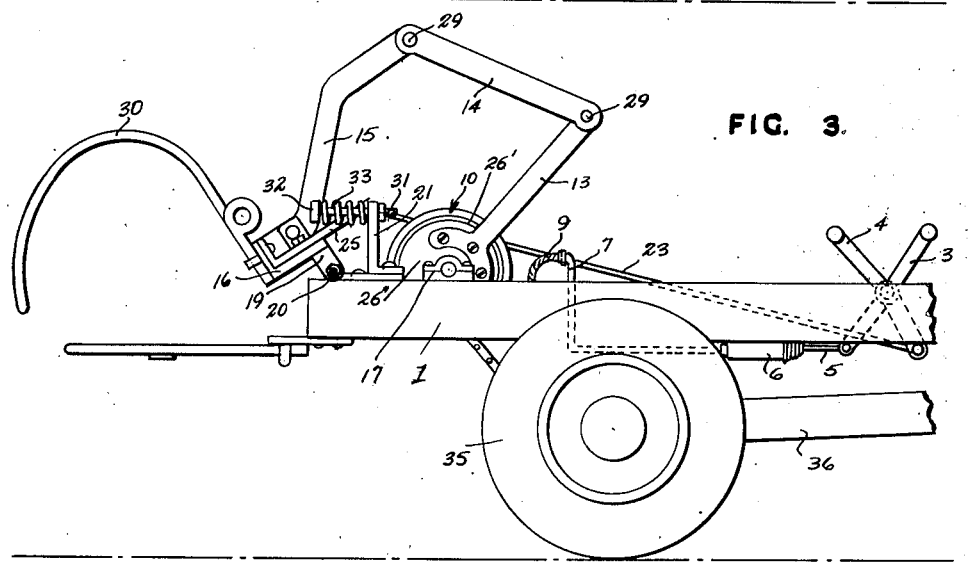
Inventor
CLIFFORD TOBIN,
Attorneys Patented Feb. 13, 1951

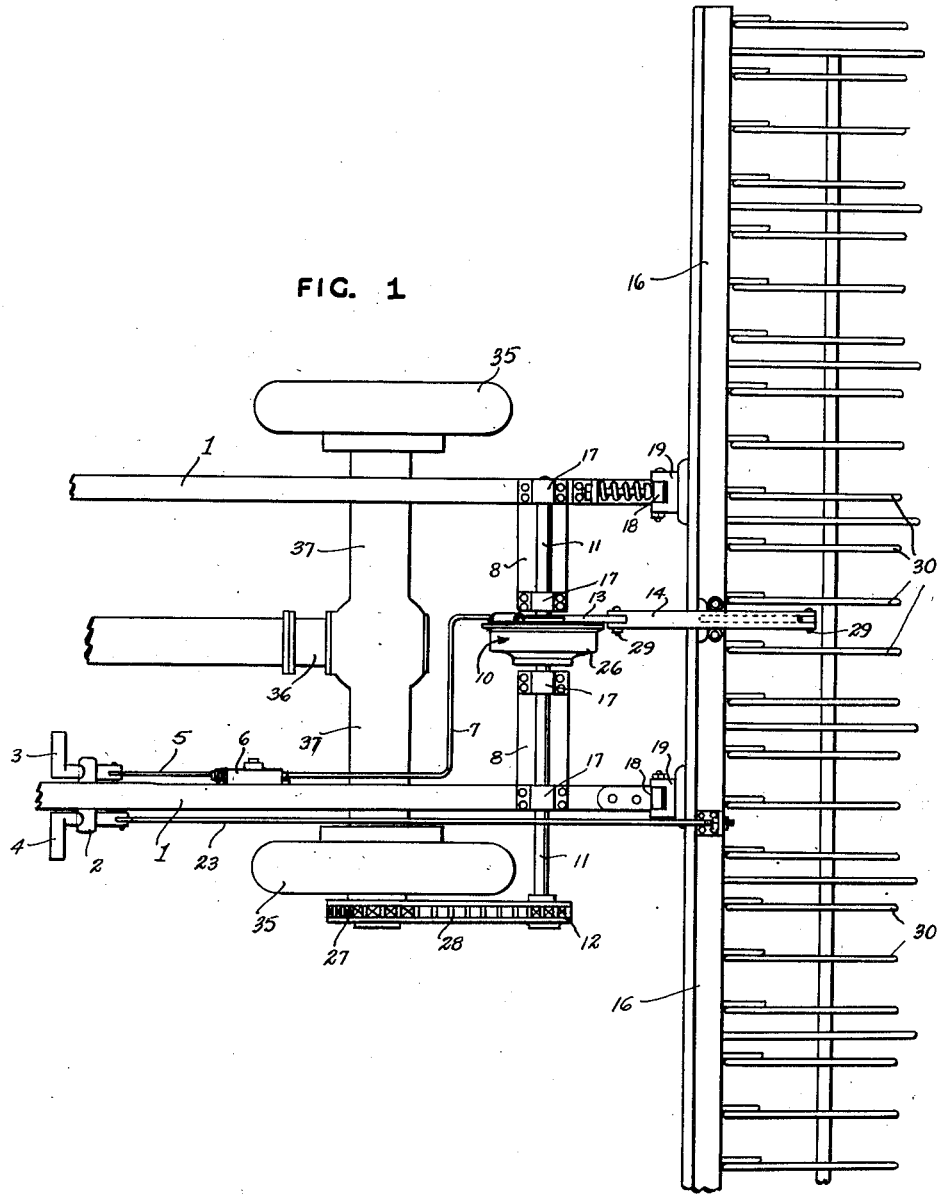

2,541,308

UNITED STATES PATENT OFFICE 2,541,308

DUMP RAKE

Clifford Tobin, Casper, Wyo.

Application December 21, 1945, Serial No. 636,435

2 Claims. (Cl. 56—386)

1

This invention relates to agricultural implements, and particularly to vehicle mounted rakes having hydraulic dumping mechanism.

An object of the invention is to provide a simple, economically operable and easily fabricated device of the character described which is supported by the frame of a vehicle, and which is dumped under the control of the operator in response to a simple mechanical motion.

A further object of the invention is to provide a hydraulically operated dumping rake in which power for the dumping operation is provided by the vehicle.

The above and still further objects of the invention will become evident upon study of the following detailed description when taken in conjunction with the accompanying drawings, wherein like numerals of reference apply to the same parts throughout the several views, and wherein:

Figure 1 is a plan view of the machine embodying this invention;

Figure 2 is a side elevational view of a portion of the machine with the rake shown in raking position; and Figure 3 is a side elevational view of a portion of the machine with the rake shown in dumping position.

Referring now to the drawings in detail, numeral 1 represents the frame member of a vehicle, which for the purposes of this description may be an automobile, provided with the normal complement of tired wheels 35, engine (not shown), drive mechanism 36, and axle housing 37, etc., all of which form no part of the present invention per se and which are therefore not further described herein.

Welded to one member of the car frame 1 is a stub shaft 2 on which are pivotably mounted the control pedals 3 and 4, of which pedal 4 is a hold down pedal for the rake and during loading thereof and pedal 3 may be actuated by the operator to cause a dumping operation of the rake.

The pedal 3 is secured to a rod 5 which serves to actuate a hydraulic cylinder 6 in such fashion as to cause ejection therefrom under pressure of hydraulic fluid into the metallic hydraulic line 7 which extends rearwardly to a channel iron support 8, welded transversely to the car frame members 1 to form a support for the rake actuating mechanism, described in detail hereinbelow.

The line 7 is supported by the channel 8, and is adjacently connected to a flexible hydraulic line 9 which is secured to the hydraulic brake

2

10 for actuation thereof. The brake 10 is of conventional design and in an actual embodiment of my device consists of a brake derived from a commercial automotive vehicle. The brake 10 acts as a clutch mechanism for dumping the rake 30 of the present machine in the following manner. The brake 10 is mounted on a shaft 11 mounted in a plurality of block bearings 17 bolted to the cross support or channel iron 8, the brake drum 26 being keyed or riveted to the shaft 11 for rotation therewith and the brake band 26' and its supporting structure 26'' being normally fixed with respect to the shaft 8 and adapted to be expanded into driven engagement with the brake drum 26 upon application thereto of hydraulic pressure from the line 9.

The brake drum 26 is driven by the sprocket 12 which is in turn driven from a sprocket 27 driveably secured to a rear wheel 35 of the vehicle in any convenient fashion, the sprockets 12 and 27 being driveably interconnected by a chain 28.

It will be evident from the structure so far described that the drum 26 rotates at all times while the vehicle is moving, and that actuation of the pedal 3 transmits hydraulic pressure to the brake 10 to cause clutch engagement of the brake bands with the drum 26 thereby to provide rotation of the brake band portion of the brake 10.

Secured as by welding to the brake band supporting structure 26'' of the brake 10 is an upwardly extending arm 13, to which is secured a rearwardly extending link 14 which is apertured at its ends to receive pins 29 for pivotal engagement with the arm 13 as well as to a further upwardly extending arm 15 welded at one extremity to a transverse angle iron or rake head 16 having downwardly curved fingers 30 secured thereto, said fingers 30 acting as raking devices.

Engagement of the brake band portion of the brake 10 with the drum portion 26 causes rotary motion of the crank arm 13 for a portion of a complete turn, and thereby causes actuation of the arm 15 which acts as a crank to cause partial rotation of the rake head 16 about pivot pins 20. The pins 20 are journaled in brackets 19, the latter being secured to the rake head 16 by suitable bolts, and extending through apertured bearing members 18, bolted to the frame 1.

Secured to the frame members 1 in any suitable manner is a vertical bracket 21 apertured at its upper end to receive horizontally a bolt 31 having a head 32 spaced from the bracket 21 by a fairly stiff spring 33. Upon actuation of the rake head during a dumping operation, the said rake head 16 strikes against the bolt head 32 enabling the spring 33 to absorb the force of the impact.

Pivotally secured to the shaft 2 is the pedal 4, connected by means of a tie rod 23 to a vertically disposed strap 25 secured as by welding or bolts to the rake head 16, whereby the rake head 16 may be retained in proper position for loading by pressure applied to the said pedal 4.

Having described an embodiment of the invention, it is to be understood that various modifications thereof may be made both in respect to details of structure as well as of arrangement of parts, without violating the spirit of the invention, or the scope of the appended claims.

What I claim is:

1. The combination with a vehicle including a frame and rear wheels supporting the frame, of a toothed rake head extending transversely of the frame and pivotally mounted upon the rear end of the frame to swing in a vertical plane to assume a lowered raking position and a raised dumping position, a horizontal transverse shaft mounted upon the rear portion of the frame, means to continuously drive the shaft from one wheel, a drum secured to the shaft to rotate therewith, a band member within the drum, an upstanding radial arm secured to the band member, an upstanding arm secured to the rake head, a link pivotally connecting the outer ends of the arms, a pedal mounted upon the frame in advance of the transverse shaft, hydraulic pressure operated means actuated by the pedal and operating band member to cause the band member to have clamping engagement with the drum to turn therewith, a second pedal pivoted upon the frame adjacent to the first pedal, an upstanding element secured to the rake head, and a link connecting the second pedal and the upstanding member so that the rake head may be manually retained in the lowered raking position.

2. The combination with a vehicle including a frame and rear wheels supporting the frame, of a toothed rake head pivotally mounted upon the rear end of the frame to be swung in a vertical plane to assume a lowered raking position and a raised position for dumping, a horizontal transverse shaft mounted upon the frame, means to continuously drive the shaft from one wheel, a hydraulic clutch device mounted upon the shaft including driving and driven members, mechanical operating means between the driven member and the rake head, means to render the clutch device active including a pedal pivoted upon the frame in advance of the transverse shaft, a second pedal pivoted upon the frame adjacent to the first pedal, an upstanding element secured to the rake head, a link connecting the second pedal and the upstanding element so that the rake head may be manually retained in the lowered raking position, and a resilient bumper mounted upon the frame and arranged within the path of travel of the rake head to limit its upward movement.

CLIFFORD TOBIN.

REFERENCES CITED

The following references are of record in the file of this patent:

UNITED STATES PATENTS

| Number | Name | Date |
|---|---|---|
| 666,348 | King et al. | Jan. 22, 1901 |
| 1,817,361 | Garretsen | Aug. 4, 1931 |
| 2,226,460 | Bristol et al. | Dec. 24, 1940 |
| 2,363,986 | Mott | Nov. 28, 1944 |
| 2,366,234 | Blaydes | Jan. 2, 1945 |